US012283858B2

(12) United States Patent
Suzuki

(10) Patent No.: US 12,283,858 B2
(45) Date of Patent: Apr. 22, 2025

(54) COMPRESSOR

(71) Applicant: FUJITSU GENERAL LIMITED, Kanagawa (JP)

(72) Inventor: Takashi Suzuki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 412 days.

(21) Appl. No.: 17/908,449

(22) PCT Filed: Mar. 24, 2021

(86) PCT No.: PCT/JP2021/012394
§ 371 (c)(1),
(2) Date: Aug. 31, 2022

(87) PCT Pub. No.: WO2021/193766
PCT Pub. Date: Sep. 30, 2021

(65) Prior Publication Data
US 2023/0087038 A1    Mar. 23, 2023

(30) Foreign Application Priority Data
Mar. 24, 2020 (JP) ................................. 2020-053156

(51) Int. Cl.
*H02K 3/32* (2006.01)
*F04B 35/04* (2006.01)
(Continued)

(52) U.S. Cl.
CPC .............. *H02K 3/325* (2013.01); *F04B 35/04* (2013.01); *F04B 39/121* (2013.01); *H02K 3/34* (2013.01); *H02K 7/14* (2013.01); *H02K 15/14* (2013.01)

(58) Field of Classification Search
CPC ................................. H02K 3/325; H02K 3/34
(Continued)

(56) References Cited

U.S. PATENT DOCUMENTS 3,877,142 A * 4/1975 Hamano ................ H02K 1/148
242/432.4
4,994,700 A * 2/1991 Bansal ..................... H02K 3/48
310/60 A
(Continued)

FOREIGN PATENT DOCUMENTS

CN    102365459 A    2/2012
CN    110024268 A    7/2019
(Continued)

OTHER PUBLICATIONS

Oct. 31, 2024, Chinese Office Action issued for related CN Application No. 202180018012.5.

*Primary Examiner* — Alexander Talpalatski
(74) *Attorney, Agent, or Firm* — Paratus Law Group, PLLC

(57) ABSTRACT

A compressor includes a stator core that includes a yoke portion and a teeth portion, a rotor that is arranged inside the stator core, a compression unit that compresses a refrigerant along with rotation of the rotor relative to the stator core, a container that has an internal space in which the stator core and the compression unit are arranged, a winding that is wound around the teeth portion, and an insulating film that is arranged in the slot so as to separate the winding from the stator core, wherein a welding portion that is fixed to the container by welding is formed on a side surface of the yoke portion on an outer diameter side, and a sheet that is sandwiched between the yoke portion and the insulating film is arranged in the slot that corresponds to the welding portion in a circumferential direction of the stator core.

3 Claims, 4 Drawing Sheets

(51) Int. Cl.
*F04B 39/12* (2006.01)
*H02K 3/34* (2006.01)
*H02K 7/14* (2006.01)
*H02K 15/14* (2006.01)

(58) Field of Classification Search
USPC .......................................................... 310/215
See application file for complete search history.

(56) References Cited

U.S. PATENT DOCUMENTS

| | | | | |
|---|---|---|---|---|
| 5,763,978 | A * | 6/1998 | Uchida | H02K 3/345 |
| | | | | 310/214 |
| 8,816,561 | B2 * | 8/2014 | Kataoka | F04B 39/06 |
| | | | | 310/215 |
| 8,987,970 | B2 * | 3/2015 | Uchida | H02K 3/487 |
| | | | | 310/214 |
| 9,077,216 | B2 * | 7/2015 | Koga | H02K 3/12 |
| 10,727,704 | B2 * | 7/2020 | Shono | H02K 1/146 |
| 2012/0019092 | A1 | 1/2012 | Kataoka | |
| 2014/0292118 | A1 * | 10/2014 | Takahashi | H02K 3/24 |
| | | | | 29/596 |
| 2019/0249653 | A1 * | 8/2019 | Suzuki | H02K 1/16 |

FOREIGN PATENT DOCUMENTS

| | | | |
|---|---|---|---|
| JP | S52-016603 | A | 2/1977 |
| JP | 2000-014067 | A | 1/2000 |
| JP | 2007129878 | A * | 5/2007 |
| JP | 2011-012667 | A | 1/2011 |
| JP | 2012-244647 | A | 12/2012 |
| JP | 2016-010227 | A | 1/2016 |
| JP | 2018-088796 | A | 6/2018 |
| WO | WO 2010/113663 | A1 | 10/2010 |

* cited by examiner

COMPRESSOR

CROSS REFERENCE TO PRIOR APPLICATION

This application is a National Stage Patent Application of PCT International Patent Application No. PCT/JP2021/012394 (filed on Mar. 24, 2021) under 35 U.S.C. § 371, which claims priority to Japanese Patent Application No. 2020-053156 (filed on Mar. 24, 2020), which are all hereby incorporated by reference in their entirety.

FIELD

The present invention relates to a compressor.

BACKGROUND

It is known that an insulating film that electrically insulates a stator core from a winding in a motor that is arranged in a compressor may sometimes be melted by heat that is generated when a back yoke portion of the stator core and a casing are welded together, and insulation between the stator core and the winding may fail at the time of melting. There is a known compressor in which a concave portion that is recessed toward an outer diameter side of a stator core is formed in a certain portion of a back yoke portion of the stator core facing a slot, which makes it possible to prevent an insulating film from being melted by heat due to welding (Patent Literature 1).

CITATION LIST

Patent Literature

Patent Literature 1: Japanese Laid-open Patent Publication No. 2011-12667

SUMMARY

Technical Problem

However, the certain portion of the back yoke portion facing the slot is a spot in which magnetic flux density is high, so that an influence of an increase in magnetic resistance due to formation of the concave portion is increased. As a result, the compressor has a problem in that efficiency of a motor is reduced and compression efficiency is therefore reduced.

The disclosed technology has been conceived in view of the foregoing situation, and an object of the disclosed technology is to provide a compressor that prevents reduction in efficiency of a motor and appropriately and electrically insulates a stator core from a winding in the motor.

Solution to Problem

According to an aspect of an embodiment, a compressor includes a stator core that is formed in a cylindrical shape and includes a yoke portion, a teeth portion, and a slot, a rotor that is arranged inside the stator core, a compression unit that compresses a refrigerant along with rotation of the rotor relative to the stator core, a container that has an internal space in which the stator core and the compression unit are arranged, a winding that is wound around the teeth portion of the stator core, and an insulating film that is arranged in the slot so as to separate the winding from the stator core, wherein a welding portion that is fixed to the container by welding is formed on a side surface of the yoke portion on an outer diameter side, and a sheet that is sandwiched between the yoke portion and the insulating film is arranged in the slot that corresponds to the welding portion in a circumferential direction of the stator core.

Advantageous Effects of Invention

The disclosed compressor is able to prevent reduction in efficiency of a motor and appropriately and electrically insulate a stator core from a winding in the motor.

DESCRIPTION OF EMBODIMENTS

A compressor according to an embodiment disclosed in the present application will be described below with reference to the drawings. The technology of the present disclosure is not limited by the description below. In addition, in the following description, the same components are denoted by the same reference symbols, and repeated explanation will be omitted.

EMBODIMENT

Figure 1:
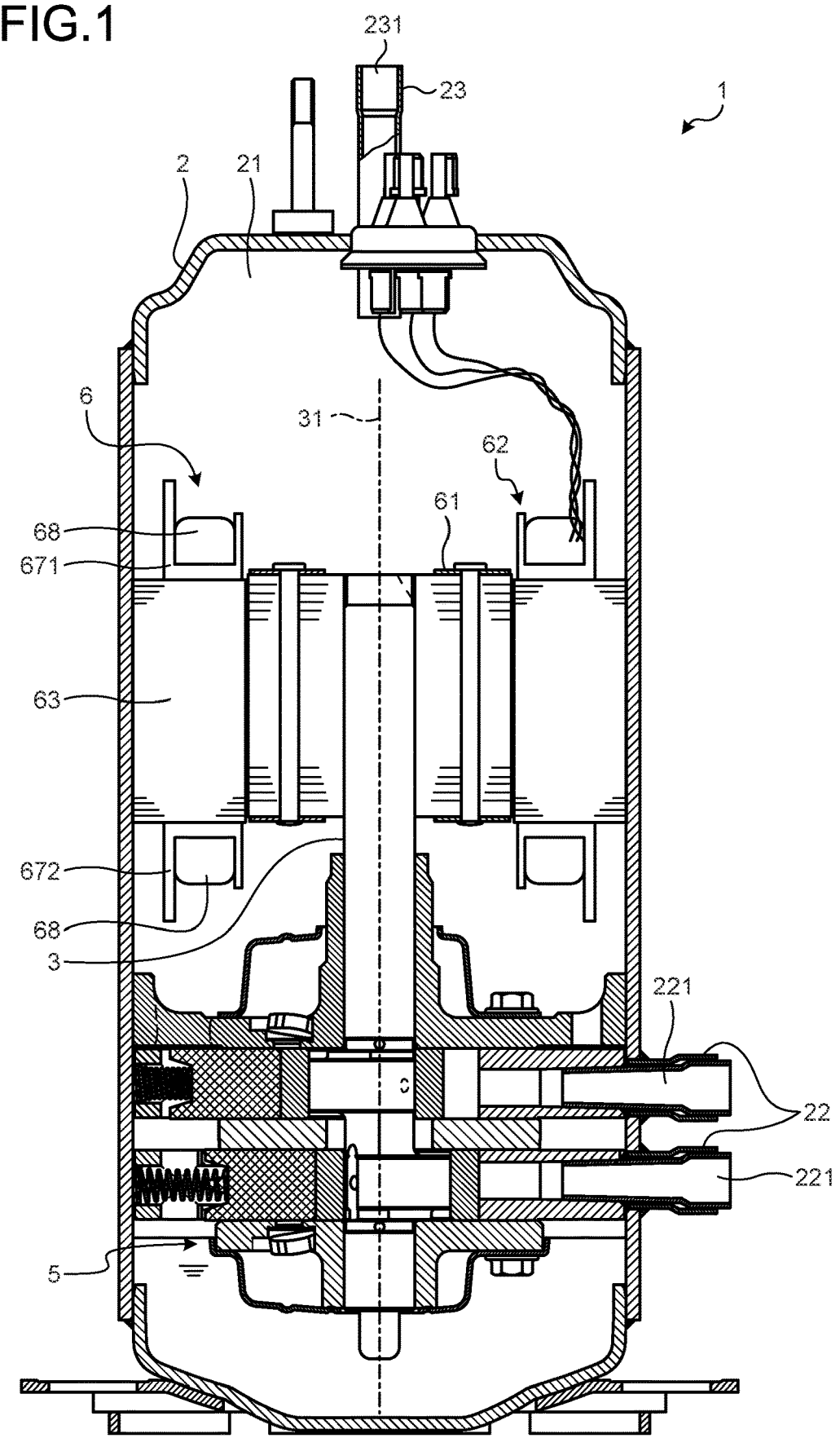
FIG. 1 is a vertical cross-sectional view of a compressor of an embodiment.

A compressor 1 includes, as illustrated in FIG. 1, a container 2, a shaft 3, a compression unit 5, and a motor unit 6. FIG. 1 is a vertical cross-sectional view of the compressor 1 of the embodiment. A sealed internal space 21 is formed in the container 2. The internal space 21 is formed in an approximately cylindrical shape. The container 2 is formed such that a central axis of a cylinder formed by the internal space 21 is parallel to a vertical direction when the container 2 is vertically installed on a horizontal plane. The container 2 includes suction pipes 22 and a discharge pipe 23. The suction pipes 22 are bonded to the container 2 such that channels 221 are formed inside the suction pipes 22 and the channels 221 are connected to a lower part of the internal space 21. The discharge pipe 23 is bonded to the container 2 such that a channel 231 is formed inside the discharge pipe 23 and the channel 231 is connected to an upper part of the internal space 21.

The shaft 3 is formed in a rod shape. The shaft 3 is arranged in the internal space 21 so as to extend along a rotation axis 31 that overlaps with the central axis of the cylinder formed by the internal space 21, and is supported by the container 2 so as to be rotatable about the rotation axis 31. The compression unit 5 is arranged in a lower part of the internal space 21. The compression unit 5 is what is called a rotary type compression mechanism, compresses a refrigerant that is supplied from the suction pipes 22 along with rotation of the shaft 3, and supplies the compressed refrigerant to a space above the compression unit 5 in the internal space 21.

The motor unit 6 is arranged above the compression unit 5 in the internal space 21. The motor unit 6 includes a rotor 61 and a stator 62. The rotor 61 is formed in an approximately cylindrical shape and fixed to the shaft 3. Therefore, the rotor 61 is supported by the container 2 so as to be rotatable about the rotation axis 31. A plurality of permanent magnets (not illustrated) are embedded in the rotor 61. The stator 62 is formed in an approximately cylindrical shape. The stator 62 is arranged so as to surround the rotor 61, and fixed to a side surface of the container 2 on an inner diameter side. The stator 62 includes a stator core 63, an upper insulator 671, a lower insulator 672, and a plurality of windings 68.

Figure 2:
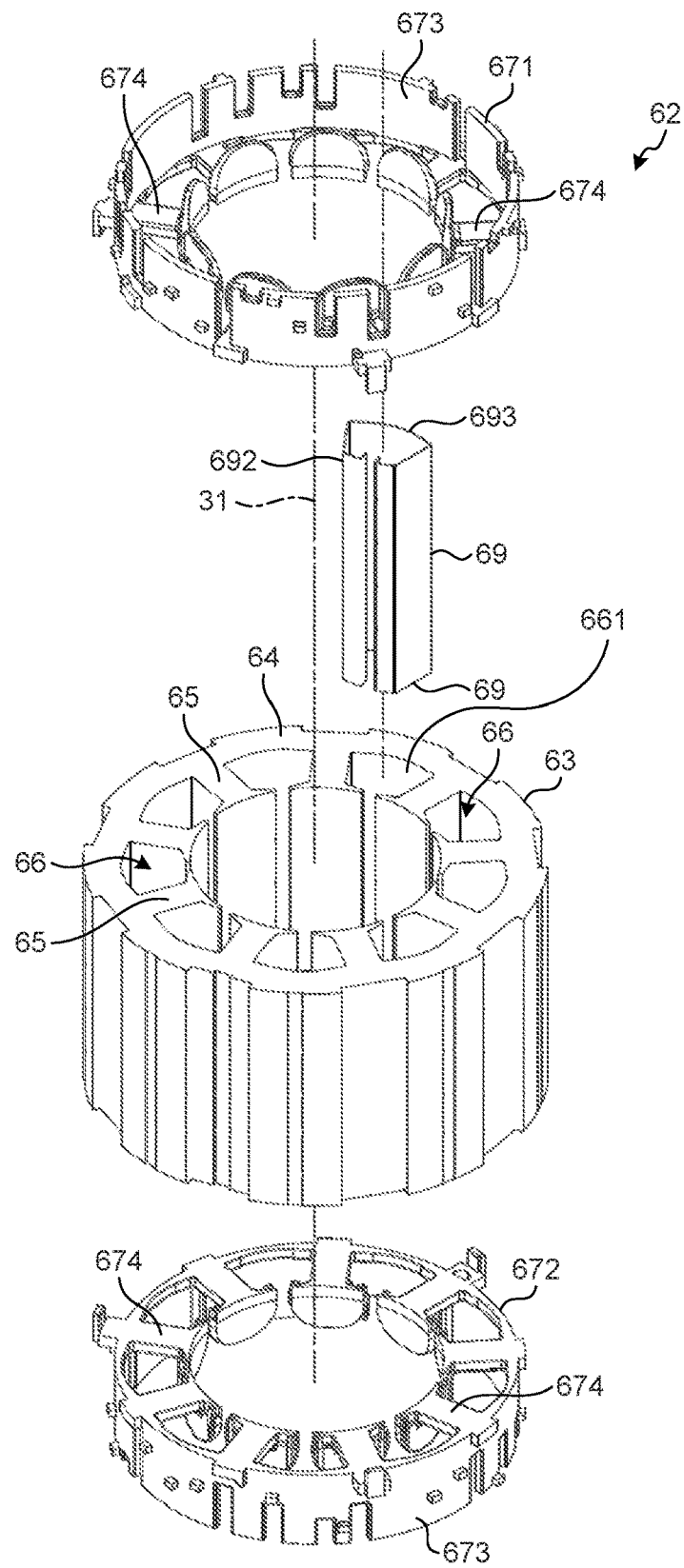
FIG. 2 is an exploded perspective view of a stator of the compressor of the embodiment.

FIG. 2 is an exploded perspective view of the stator 62 of the compressor 1 of the embodiment. The stator core 63 is formed in an approximately cylindrical shape, and is formed by laminating a plurality of electromagnetic steel plates that are made of a soft magnetic material, such as a silicon steel plate. The stator core 63 in the cylindrical shape is arranged such that a central axis overlaps with the rotation axis 31 of the rotor 61. The stator core 63 includes a yoke portion 64 and a plurality of teeth portions 65. The yoke portion 64 is formed in an approximately cylindrical shape. Each of the teeth portions 65 is formed in an approximately columnar shape and arranged inside the yoke portion 64 such that the teeth portions 65 are arranged at regular intervals on an inner peripheral surface of the yoke portion 64. One end of each of the teeth portions 65 is connected to the inner peripheral surface of the yoke portion 64, that is, is formed so as to protrude toward the center from the inner peripheral surface of the yoke portion 64. A plurality of slots 66 are formed in the stator core 63. Each of the slots 66 is a space that is enclosed by the yoke portion 64 and adjacent two of the teeth portions 65.

The stator 62 further includes a plurality of insulating films that correspond to the plurality of slots 66. One insulating film 69 among the plurality of insulating films is made of an insulator, such as polyethylene terephthalate (PET), and formed into a bent sheet shape. The insulating film 69 includes a first teeth facing portion 691, a second teeth facing portion 692, and a yoke facing portion 693. The yoke facing portion 693 is formed between the first teeth facing portion 691 and the second teeth facing portion 692. The insulating film 69 is arranged in each of the slots 66.

The upper insulator 671 is made of an insulator, such as polybutylene terephthalate (PBT), and includes a peripheral wall portion 673 and a plurality of winding body portions 674. The peripheral wall portion 673 is formed in an approximately cylindrical shape. Each of the winding body portions 674 is formed in a columnar shape and arranged inside the peripheral wall portion 673 such that the winding body portions 674 are arranged at regular intervals on an inner peripheral surface of the peripheral wall portion 673. One end of each of the winding body portions 674 is connected to the inner peripheral surface of the peripheral wall portion 673, that is, is formed so as to protrude toward the center from the inner peripheral surface of the peripheral wall portion 673. The upper insulator 671 is arranged above the stator core 63 such that the plurality of winding body portions 674 are located along upper edge surfaces of the plurality of teeth portions 65.

The lower insulator 672 is made of an insulator, such as polybutylene terephthalate (PBT), and includes the peripheral wall portion 673 and the plurality of winding body portions 674, similarly to the upper insulator 671. The peripheral wall portion 673 is formed in an approximately cylindrical shape. Each of the winding body portions 674 is formed in a columnar shape and arranged inside the peripheral wall portion 673 such that the winding body portions 674 are arranged at regular intervals on the inner peripheral surface of the peripheral wall portion 673. One end of each of the winding body portions 674 is connected to the inner peripheral surface of the peripheral wall portion 673, that is, is formed so as to protrude toward the center from the inner peripheral surface of the peripheral wall portion 673. The lower insulator 672 is arranged below the stator core 63 such that the plurality of winding body portions 674 are located along lower edge surfaces of the plurality of teeth portions 65. In the embodiment, the upper insulator 671 and the lower insulator 672 are formed in the same shapes such that a pair of insulators 67 can be mounted without any distinction between top and bottom.

Figure 3:
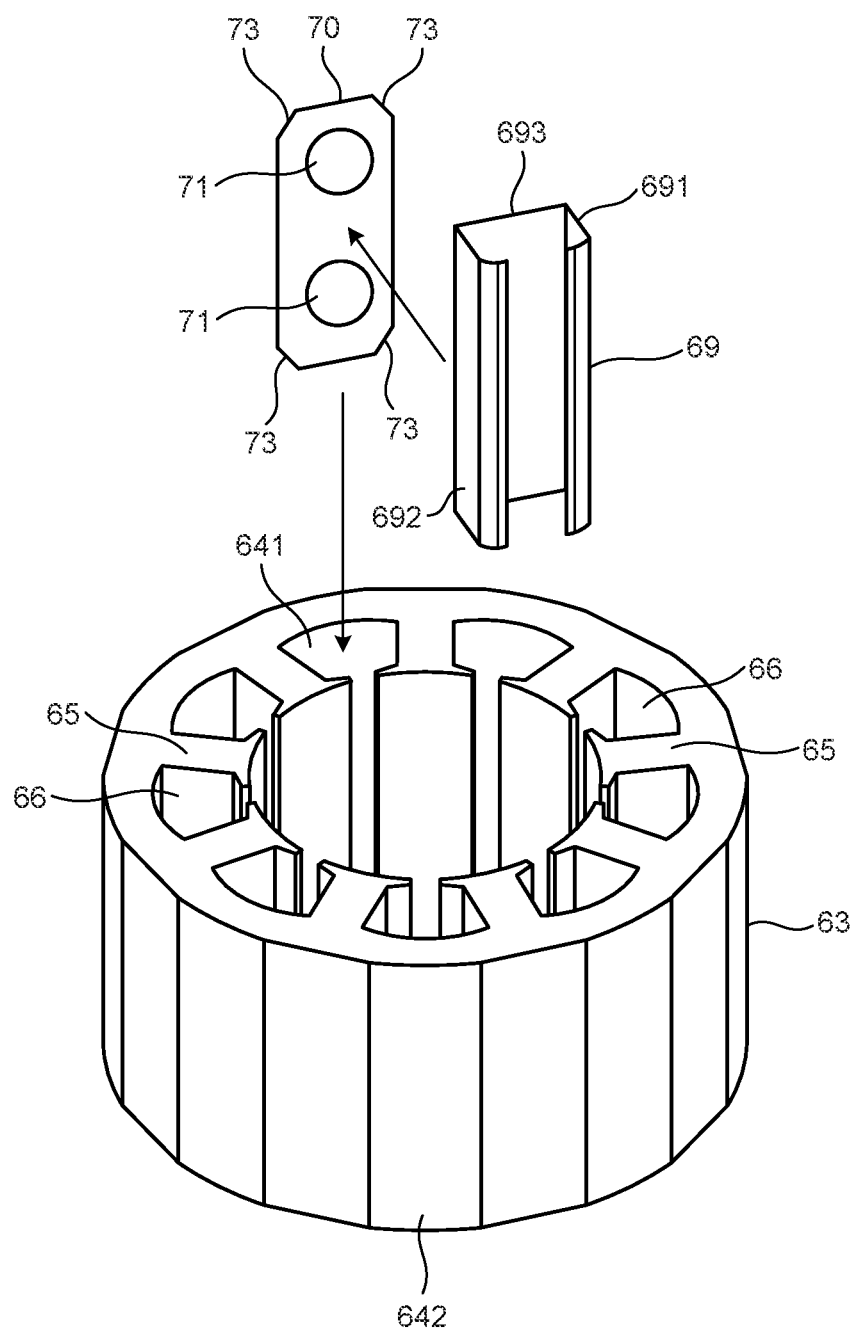
FIG. 3 is another exploded perspective view of the stator of the compressor of the embodiment.

FIG. 3 is another exploded perspective view of the stator 62 of the compressor 1 of the embodiment. The stator 62 further includes a plurality of sheets corresponding to the plurality of insulating films. Each of sheets 70 is made of a heat-resistant (fire-resistant) material, such as polyethylene naphthalate (PEN), and formed into an approximately rectangular thin plate. Polyethylene naphthalate (PEN) has higher heat resistance than polyethylene terephthalate (PET) that is used for the plurality of insulating films. Each of the sheets 70 has four chamfered portions 73. The four chamfered portions 73 are formed at four corners of each of the sheets 70 such that the four corners corresponding to four vertices of a rectangle formed by each of the sheets 70 are prevented from becoming sharp, for example, such that the four corners of each of the sheets 70 are rounded. Holes 71 that penetrate in a thickness direction of each of the sheets 70 are formed in each of the sheets 70. The holes 71 are formed in approximately circular shapes. Each of the sheets 70 is arranged, together with the insulating film 69, in a slot 661 that corresponds to a welding hole 24, which is formed in the container 2 (to be described later), in a circumferential direction of the stator core 63 among the plurality of slots 66.

Figure 4:
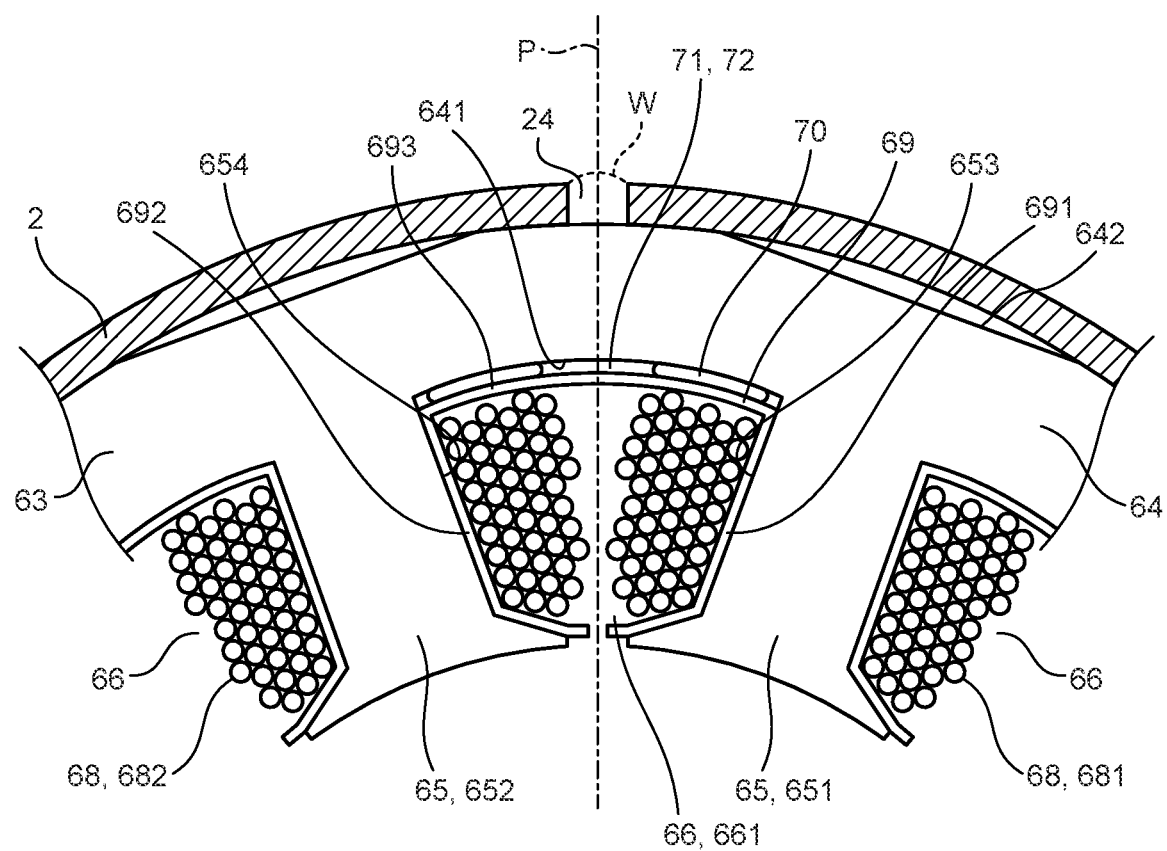
FIG. 4 is a plan view of a slot of the compressor of the embodiment.

The slot 661 among the slots 66 is formed between, as illustrated in FIG. 4, a first teeth portion 651 and a second teeth portion 652 that are adjacent to each other among the plurality of teeth portions 65. FIG. 4 is a plan view of the slot 661 of the compressor 1 of the embodiment. The insulating film 69 corresponding to the slot 661 is arranged in the slot 661. At this time, the first teeth facing portion 691 of the insulating film 69 is arranged so as to extend along a slot facing surface 653 of the first teeth portion 651 facing the slot 661. The second teeth facing portion 692 of the insulating film 69 is arranged so as to extend along a slot facing surface 654 of the second teeth portion 652 facing the slot 661. A yoke facing portion 693 of the insulating film 69 is arranged so as to extend along a slot facing surface 641 of the yoke portion 64 facing the slot 661.

A plurality of windings 68 are wound around the plurality of teeth portions 65. Specifically, a first winding 681 among the plurality of windings 68 is wound around the first teeth portion 651. A second winding 682 different from the first winding 681 among the plurality of windings 68 is wound around the second teeth portion 652. At this time, the first winding 681 is wound around the first teeth facing portion 691 of the insulating film 69 together with the first teeth portion 651 among the plurality of teeth portions 65, and the first teeth facing portion 691 and the first teeth portion 651 are surrounded by the first winding 681. The first teeth facing portion 691 extends along the slot facing surface 653 of the first teeth portion 651 to prevent the first winding 681 from coming into contact with the first teeth portion 651 and electrically insulate the stator core 63 from the first winding 681. The second winding 682 is wound around the second teeth facing portion 692 of the insulating film 69 together with the second teeth portion 652 among the plurality of teeth portions 65, and the second teeth facing portion 692 and the second teeth portion 652 are surrounded by the second winding 682. The second teeth facing portion 692 extends along the slot facing surface 654 of the second teeth portion 652 to prevent the second winding 682 from coming into contact with the second teeth portion 652 and electrically insulate the stator core 63 from the second winding 682.

The yoke facing portion 693 extends along the slot facing surface 641 of the yoke portion 64 to prevent the first winding 681 and the second winding 682 from coming into contact with the yoke portion 64. The yoke facing portion 693 electrically insulates the stator core 63 from the windings 68 (the first winding 681 and the second winding 682) because the first winding 681 and the second winding 682 are prevented from coming into contact with the slot facing surface 641 of the yoke portion 64. The other insulating films other than the insulating film 69 among the plurality of insulating films electrically insulate the stator core 63 from the windings 68, similarly to the insulating film 69.

The first winding 681 is wound around one of the winding body portions 674 in the upper insulator 671 corresponding to the first teeth portion 651 and around the first teeth portion 651, and the one of the winding body portions 674 and the first teeth portion 651 are surrounded by the first winding 681. The one of the winding body portions prevents the first winding 681 from coming into contact with an upper edge surface of the first teeth portion 651 and electrically insulates the stator core 63 from the first winding 681.

The first winding 681 is wound around one of the winding body portions 674 in the lower insulator 672 corresponding to the first teeth portion 651 and around the first teeth portion 651, and the one of the winding body portions 674 and the first teeth portion 651 are surrounded by the first winding 681. The one of the winding body portions prevents the first winding 681 from coming into contact with a lower edge surface of the first teeth portion 651 and electrically insulates the stator core 63 from the first winding 681.

The plurality of welding holes 24 are formed in the container 2 at positions at which the stator core 63 is fixed in a direction of the rotation axis 31. Each of the welding holes 24 is arranged in the vicinity of the slot 661 among the plurality of slots 66, and enables communication between the outside of the container 2 and the internal space 21. The slot 661 is arranged at a position corresponding to each of the welding holes 24 in the circumferential direction of the stator core 63. Specifically, a perpendicular line P is extended from each of the welding holes 24 to the rotation axis 31 intersects with corresponding one of the slots 661.

The yoke facing portion 693 extends along the slot facing surface 641 of the yoke portion 64 to prevent the first winding 681 and the second winding 682 from coming into contact with the slot facing surface 641. The sheet 70 is arranged inside the slot 661 so as to be sandwiched between the yoke facing portion 693 of the insulating film 69 and the slot facing surface 641 of the yoke portion 64. Specifically, the sheet 70 is arranged so as to be sandwiched between the yoke facing portion 693 and the slot facing surface 641 of the yoke portion 64 and intersect with the perpendicular line P. At this time, the holes 71 are formed at positions that intersect with the perpendicular line P in the sheet 70. Specifically, the holes 71 formed in the sheet 70 are formed at positions corresponding to a welding portion W in the circumferential direction of the stator core 63 and in the direction of the rotation axis 31 of the rotor 61. The holes 71 are formed such that diameters of the holes 71 are larger than a diameter of the welding hole 24. An air layer 72 is formed between the slot facing surface 641 of the yoke portion 64 and the yoke facing portion 693 of the insulating film 69 because of formation of the holes 71 in the sheet 70. In the compressor 1, the sheets 70 are arranged in the respective slots 661 that correspond to the welding portions W (the welding holes 24) in the circumferential direction of the stator core 63. Specifically, the compressor 1 includes the same number of the sheets 70 as the number of the welding portions W. Meanwhile, the plurality of sheets 70 need not be always arranged in only the slots 661 that correspond to the welding portions W, but may be arranged in all of the plurality of slots 66.

The upper insulator 671 is mounted on the stator core 63 such that an upper edge surface of each of the sheets 70 faces a part of the upper insulator 671. The lower insulator 672 is mounted on the stator core 63 such that a lower edge surface of each of the sheets 70 comes into contact with a part of the lower insulator 672. In the stator 62, the upper insulator 671 and the lower insulator 672 are mounted on the stator core 63 as described above, so that movement of the sheets 70 and the insulating films 69 in the direction of the rotation axis 31 is restricted. Therefore, in the stator 62, it is possible to appropriately fix the plurality of sheets 70 and the plurality of insulating films 69 to the stator core 63 while preventing the plurality of sheets 70 and the plurality of insulating films 69 from coming off from the plurality of slots 66.

Method of Manufacturing Compressor 1

In a method of manufacturing the compressor 1, the lower insulator 672 is mounted on the stator core 63 such that the plurality of winding body portions 674 are located along the lower edge surfaces of the plurality of teeth portions 65. After the lower insulator 672 is mounted on the stator core 63, the plurality of (for example, nine) insulating films 69 are mounted on the stator core 63 by being inserted into the respective slots 661 of the stator core 63.

After the insulating films 69 are inserted in the slots 661, each of the plurality of (for example, three) sheets 70 is mounted on the stator core 63 by being inserted between the yoke portion 64 and the yoke facing portion 693 of the insulating film 69 in each of portions (for example, three portions) corresponding to the welding holes 24 of the container 2 in the circumferential direction of the stator core 63. At this time, because the chamfered portions 73 are formed at four corners of each of the sheets 70, it is possible to easily insert each of the sheets 70 between the yoke portion 64 and the yoke facing portion 693, so that it is possible to simplify operation of mounting the sheets 70 on the stator core 63. As for the sheets 70, the lower edge surface of each of the sheets 70 comes into contact with a part of the lower insulator 672, so that it is possible to prevent the sheets 70 from coming off from lower sides of the slots 661, and it is possible to simplify the operation of mounting the sheets 70 on the stator core 63.

After the plurality of insulating films 69 and the plurality of sheets 70 are mounted on corresponding portions of the stator core 63, the upper insulator 671 is mounted on the stator core 63 such that the plurality of winding body portions 674 are located along the plurality of teeth portions 65. After the upper insulator 671, the lower insulator 672, the plurality of insulating films 69, and the plurality of sheets 70 are mounted on the stator core 63, the plurality of windings 68 are mounted on the stator core 63 by being wound around the plurality of teeth portions 65. The upper insulator 671, the lower insulator 672, the plurality of insulating films 69, the plurality of sheets 70, and the plurality of windings 68 are mounted on the stator core 63, so that the stator core 63 is formed on the stator 62.

The rotor 61 is mounted on the compression unit 5 by fixing the rotor 61 to the shaft 3 that is connected to the compression unit 5. The motor unit 6 is formed by inserting the rotor 61 that is mounted on the compression unit 5 to the inside of the stator 62. The motor unit 6 and the compression unit 5 are inserted in the container 2 and arranged at predetermined positions that are determined in advance in the internal space 21 of the container 2.

After the motor unit 6 and the compression unit 5 are arranged at the predetermined positions in the internal space 21 of the container 2, the stator core 63 is fixed to the container 2 by performing arc bonding between the container 2 and a side surface 642 of the yoke portion 64 on an outer diameter side via the plurality of welding holes 24. At this time, in the side surface 642 of the yoke portion 64 on the outer diameter side, the welding portions W with respect to the container 2 are formed at positions corresponding to the respective welding holes 24 of the container 2. Welding heat (heat generated at the time of welding) is transmitted from the welding portions W of the yoke portion 64 to the slots 661 in the yoke portion 64. However, because the motor unit 6 includes the sheets 70 that are arranged between the yoke portion 64 and the insulating films 69 at the positions corresponding to the welding portions W in the circumferential direction of the stator core 63, it is possible to reduce welding heat that is transmitted from the yoke portion 64 to the insulating films 69 at the time of welding. Furthermore, the holes 71 are arranged in the sheets 70, so that the air layers 72 are formed between the yoke portion 64 and the insulating films 69, and it is possible to further reduce the welding heat that is transmitted from the welding portions W of the yoke portion 64 to the insulating films 69 at the time of welding. Therefore, in the motor unit 6, it is possible to reduce the welding heat that is transmitted to the insulating films 69 at the time of welding, so that it is possible to prevent the insulating films 69 from being melted by the welding heat at the time of welding.

At the positions at which the welding holes 24 of the container 2 are formed, the container 2 and the yoke portion 64 of the stator core 63 are subjected to arc welding via the welding holes 24, so that melted metal caused by melting a filler metal (welding rod) and a welding target member (base material) by heating is cooled and the welding portions W are formed. As for the container 2, the internal space 21 is sealed after the stator core 63 is fixed to the container 2.

Operation of Compressor 1

The compressor 1 is arranged in a refrigeration cycle device (not illustrated) and is used to compress a refrigerant and circulate the refrigerant in the refrigeration cycle device. The motor unit 6 generates a rotating magnetic field in an internal space of the stator 62 by appropriately applying three-phase voltage to the plurality of windings 68. The rotor 61 rotates with the aid of the rotating magnetic field that is generated by the stator 62. The shaft 3 transmits the rotation of the rotor 61 to the compression unit 5. The compression unit 5, with the rotation of the rotor 61, sucks a low-pressure gas refrigerant via the suction pipes 22, compresses the sucked low-pressure gas refrigerant to generate a high-pressure gas refrigerant, and supplies the high-pressure gas refrigerant to a space between the compression unit 5 and the motor unit 6 in the internal space 21.

The high-pressure gas refrigerant that is supplied to the space between the compression unit 5 and the motor unit 6 in the internal space 21 passes through a gap that is formed in the motor unit 6, and is then supplied to a space above the motor unit 6 in the internal space 21. The high-pressure gas refrigerant that is supplied to the space above the motor unit 6 in the internal space 21 is discharged to a device in the subsequent stage of the compressor 1 in the refrigeration cycle device via the discharge pipe 23.

Effects of Compressor 1 of Embodiment

The compressor 1 of the embodiment includes the stator core 63, the rotor 61, the compression unit 5, the container 2, the first winding 681, the second winding 682, the insulating film 69, and the sheet 70. The stator core 63 is formed in a cylindrical shape and includes the yoke portion 64 and the plurality of teeth portions 65. The rotor 61 is arranged inside the stator core 63. The compression unit 5 compresses a refrigerant along with rotation of the rotor 61 relative to the stator core 63. The internal space 21 in which the stator core 63 and the compression unit 5 are arranged is formed inside the container 2. The first winding 681 is wound around the first teeth portion 651 of the stator core 63. The second winding 682 is wound around the second teeth portion 652 of the stator core 63. The insulating film 69 is arranged in the slot 66 so as to separate the first winding 681 from the stator core 63 and separate the second winding 682 from the stator core 63. The welding portions W that are fixed to the container 2 by welding are formed on the side surface 642 of the yoke portion 64 on the outer diameter side. The sheets 70 that are sandwiched between the yoke portion 64 and the insulating films 69 are arranged in the slots 661 that corresponds to the welding portions W in the circumferential direction of the stator core 63.

In the compressor 1, the sheets 70 are arranged between the yoke portion 64 and the insulating films 69, so that a cavity or a recess is not formed in the yoke portion 64, and it is possible to reduce the welding heat that is transmitted from the welding portions to the insulating films 69. In the compressor 1, a cavity or a recess is not formed in the yoke portion 64, so that it is possible to reduce magnetic resistance of the yoke portion 64 and prevent reduction in efficiency of the motor unit 6. In the compressor 1, the welding heat that is transmitted to the insulating films 69 is reduced, so that it is possible to prevent the insulating films 69 from being melted by the welding heat at the time of welding, and it is possible to appropriately and electrically insulate the plurality of windings 68 from the stator core 63.

Furthermore, the holes 71 are formed in the sheets 70 of the compressor 1 of the embodiment at positions that intersect with the perpendicular lines P that are extended from the welding portions W, which are formed in portions in which the container 2 and the yoke portion 64 are welded, to the rotation axis 31 of the rotor 61. Specifically, the holes 71 are formed in the sheets 70 at positions corresponding to the welding portions W in the circumferential direction of the stator core 63 and in the direction of the rotation axis 31 of the rotor 61. At this time, in the compressor 1, due to the formation of the holes 71 in the sheets 70, the air layers 72 are formed between the yoke portion 64 and the insulating films 69, so that it is possible to reduce the welding heat that is transmitted from the welding portions W to the insulating films 69 at the time of welding.

Meanwhile, the holes 71 in the sheets 70 of the compressor 1 of the embodiment as described above are formed so as to have larger diameters than the diameters of the welding holes 24 or the diameters of the welding portions, but may be formed so as to have smaller diameters than the diameters of the welding holes 24 or the diameters of the welding portions. Furthermore, while the holes 71 are formed in circular shapes, but the holes 71 may be formed in different shapes other than the circular shapes. Examples of the other shapes include polygonal shapes. Moreover, while the holes 71 are formed in the sheets 70 of the compressor 1 of the embodiment as described above, the holes 71 need not always be formed. Even in this case, because of the arrangement of the sheets 70, the compressor 1 is able to reduce the welding heat that it transmitted to the insulating films 69, so that it is possible to appropriately and electrically insulate the stator core 63 from the plurality of windings 68.

Furthermore, the sheets 70 of the compressor 1 of the embodiment are formed such that lengths of the sheets 70 in the circumferential direction are shorter than lengths of the slot facing surfaces 641 in the circumferential direction so as to prevent a part of the sheets 70 from being sandwiched between the insulating films 69 and the plurality of teeth portions 65. In this case, in the compressor 1, it is possible to reduce sizes of the sheets 70, so that it is possible to reduce a manufacturing cost. Moreover, the sheets 70 are less likely to be deformed, so that it is possible to prevent positional misalignment of the windings 68.

Meanwhile, the sheets 70 of the compressor 1 of the embodiment as described above are formed with small sizes so as not to be sandwiched between the insulating films 69 and the plurality of teeth portions 65, but may be formed with large sizes so as to be sandwiched between the insulating films 69 and the plurality of teeth portions 65. For example, the sheets 70 may be formed in the same shapes as the insulating films 69 so as to overlap with the insulating films 69. In the compressor 1, even if the sheets 70 are sandwiched between the insulating films 69 and the plurality of teeth portions 65, because the sheets 70 are arranged between the yoke portion 64 and the insulating films 69, it is possible to reduce the welding heat that is transmitted to the insulating films 69.

Furthermore, the sheets 70 of the compressor 1 are made of a heat resistant material (that is not easily melted by heat). In this case, the compressor 1 is able to prevent the sheets 70 from being melted by the welding heat, so that it is possible to appropriately reduce the welding heat that is transmitted to the insulating films 69. In the embodiment, the sheets 70 are made of a different material (for example, polyethylene naphthalate (PEN)) that has higher heat resistance than a material of the insulating films 69 (for example, polyethylene terephthalate (PET)). With this configuration, it is possible to use a relatively cheap material for the insulating films 69 and use a highly heat-resistant material for the sheets 70 to prevent the insulating films 69 from being melted. Meanwhile, the sheets 70 may be made of polyimide that is thermosetting resin, instead of polyethylene naphthalate (PEN) that is thermoplastic resin as described above. Furthermore, it may be possible to use, as the material of the sheets 70, a material for which a glass transition point is higher than that of the material of the insulating films 69. Moreover, it is preferable to use, as the material of the sheets 70, a heat-resistant material that is not burned by heat at the time of welding.

Meanwhile, the sheets 70 of the compressor 1 of the embodiment as described above are made of a material that has higher heat resistance than the material of the insulating films 69, but the sheets 70 may be made of the same material as the material of the insulating films 69. Even in this case, the compressor 1 is able to appropriately reduce the welding heat that is transmitted to the insulating films 69. In this case, it is possible to form the insulating films 69 and the sheets 70 by using the same material, so that it is possible to reduce a manufacturing cost.

Furthermore, the compressor 1 of the embodiment further includes the upper insulator 671 and the lower insulator 672. The upper insulator 671 includes the plurality of winding body portions 674 such that the plurality of windings 68 are wound around the plurality of winding body portions 674 and the plurality of teeth portions 65, respectively. The lower insulator 672 includes the plurality of winding body portions 674 such that the plurality of windings 68 are wound around the plurality of winding body portions 674 and the plurality of teeth portions 65, respectively. The upper edge surfaces of the sheets 70 face the upper insulator 671. The lower edge surfaces of the sheets 70 come into contact with the lower insulator 672. In this case, the upper insulator 671 restricts movement of the sheets 70 in an upward direction along the rotation axis 31 of the rotor 61. Furthermore, the lower insulator 672 restricts movement of the sheets 70 in a downward direction along the rotation axis 31 of the rotor 61. With this configuration, the compressor 1 is able to appropriately fix the sheets 70 to the stator core 63 such that the sheets 70 do not deviate from the predetermined positions.

Meanwhile, the sheets 70 of the compressor 1 of the embodiment as described above are fixed to the stator core 63 by bringing the end faces of the sheets 70 into contact with the upper insulator 671 and the lower insulator 672, but may be fixed to the stator core 63 by a different method. For example, the sheets 70 may be fixed to the stator core 63 by being sandwiched between the insulating films 69 and the yoke portion 64. Even in this case, the compressor 1 is able to appropriately fix the sheets 70 to the stator core 63, so that it is possible to reduce the welding heat that is transmitted to the insulating films 69 and appropriately and electrically insulate the stator core 63 from the plurality of windings 68.

While the embodiment has been described above, the embodiment is not limited by the contents described above. Furthermore, components described above include one that can be easily thought of by a person skilled in the art, one that is practically identical, and one that is within an equivalent range. Moreover, the components as described above may be combined appropriately. Furthermore, within the scope not departing from the gist of the embodiment, various omission, replacement, and modifications of the components may be made.

REFERENCE SIGNS LIST 1 compressor
2 container
21 internal space
24 welding hole
31 rotation axis
5 compression unit
6 motor unit
61 rotor
62 stator
63 stator core
64 yoke portion
65 teeth portions
651 first teeth portion
652 second teeth portion
66 slot
671 upper insulator
672 lower insulator
68 windings
681 first winding
682 second winding
69 insulating film
70 sheet
71 hole 72 air layer
P perpendicular line
W welding portion

The invention claimed is:

1. A compressor comprising:
a stator core that is formed in a cylindrical shape and includes a yoke portion, a teeth portion, and a slot;
a rotor that is arranged inside the stator core;
a compression unit that compresses a refrigerant along with rotation of the rotor relative to the stator core;
a container that has an internal space in which the stator core and the compression unit are arranged;
a winding that is wound around the teeth portion of the stator core; and
an insulating film that is arranged in the slot so as to separate the winding from the stator core, wherein
a welding portion that is fixed to the container by welding is formed on a side surface of the yoke portion on an outer diameter side,
a sheet that is sandwiched between the yoke portion and the insulating film is arranged in the slot that corresponds to the welding portion in a circumferential direction of the stator core, and
in a part of the sheet sandwiched between the yoke portion and the insulating film, a hole is formed at a position corresponding to the welding portion in the circumferential direction of the stator core and in a direction of a rotation axis of the rotor.

2. The compressor according to claim 1, wherein the sheet is made of a material that has higher heat resistance than a material of the insulating film.

3. The compressor according to claim 1, further comprising:
an insulator that includes a winding body such that the winding is wound around the winding body and the teeth portion, wherein
at least one of end faces of the sheet in a direction of a rotation axis of the rotor comes into contact with the insulator.

* * * * *